United States Patent

[11] 3,622,804

| [72] | Inventor | Claybourne Mitchell, Jr.<br>Ann Arbor, Mich. |
| --- | --- | --- |
| [21] | Appl. No. | 65,267 |
| [22] | Filed | Aug. 19, 1970 |
| [45] | Patented | Nov. 23, 1971 |
| [73] | Assignee | The Udylite Corporation<br>Warren, Mich.<br>Continuation of application Ser. No.<br>665,497, Sept. 5, 1967. |

[54] SYSTEM FOR PERIODICALLY REVERSING ELECTRICAL ENERGY THROUGH A LOAD
8 Claims, 4 Drawing Figs.

[52] U.S. Cl................................................ 307/252 T,
204/48, 204/228, 307/242, 328/81
[51] Int. Cl................................................ H03k 17/00
[50] Field of Search............................................ 315/251,
196, 197; 328/81; 323/22 SC; 307/252 T, 242;
332/9 T

[56] References Cited
UNITED STATES PATENTS

| 3,025,418 | 3/1962 | Brahm........................ | 307/252 |
| 3,184,670 | 5/1965 | Reynolds.................... | 307/252 X |
| 3,287,622 | 11/1966 | Eckenfelder et al......... | 307/252 X |

Primary Examiner—Donald D. Forrer
Assistant Examiner—B. P. Davis
Attorneys—Stanley H. Lieberstein and William J. Schramm ABSTRACT: A system for feeding electrical energy from an alternating current source to a load through a rectifier arrangement, the arrangement comprising one or more pairs of back-to-back rectifying devices connected in parallel between an alternating current source and the load. Each of the elements in the pairs of rectifying elements are separately controlled such that the system may provide a main current flow of a preselected configuration and wherein the opposite rectifying element is periodically selectively energized to provide a periodic reversal of the energy through the load.

PATENTED NOV 23 1971
3,622,804
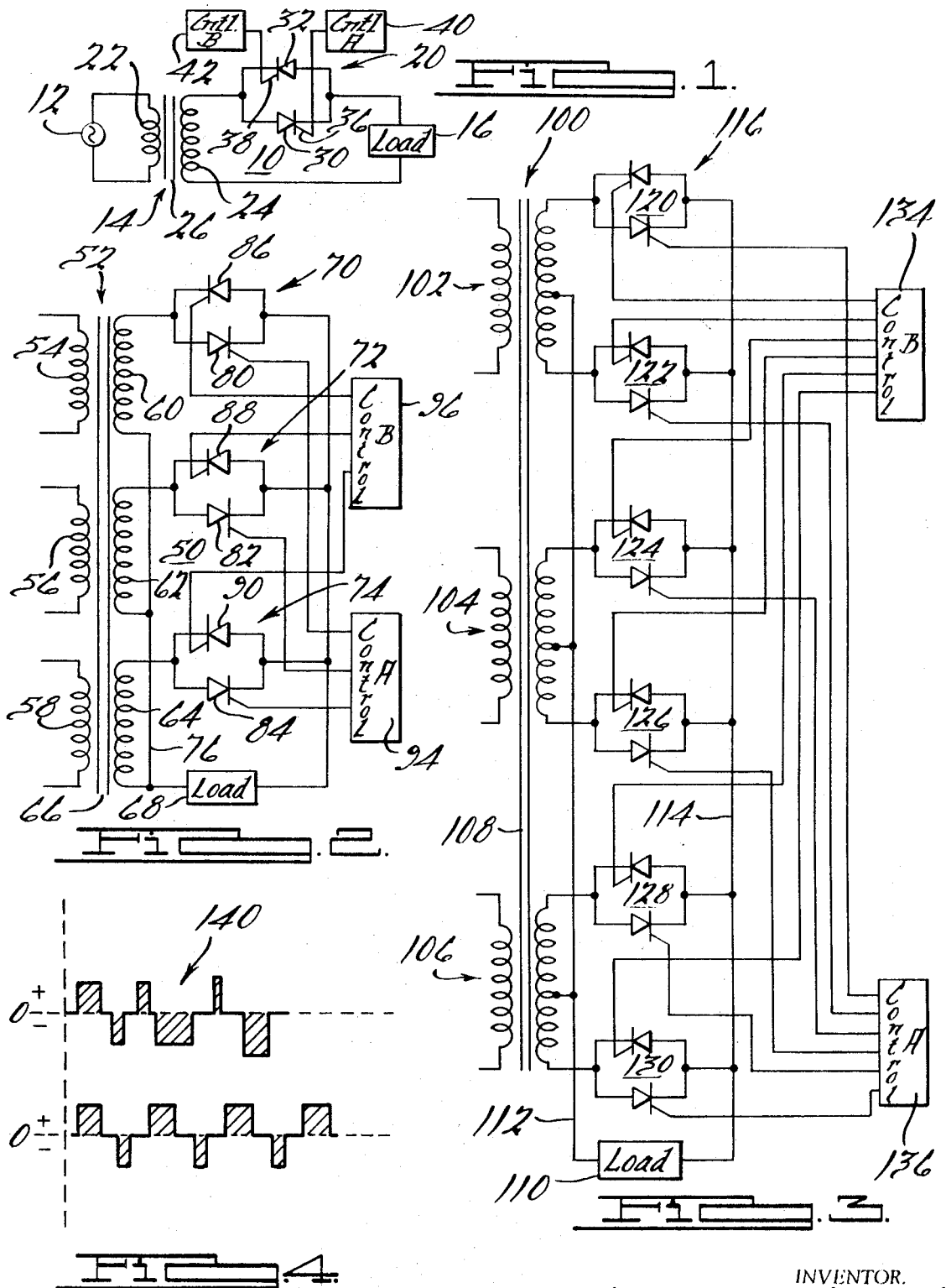

SYSTEM FOR PERIODICALLY REVERSING ELECTRICAL ENERGY THROUGH A LOAD

This is a continuation of application Ser. No. 665,497, filed Sept. 5, 1967.

SUMMARY AND BACKGROUND OF THE INVENTION

This invention relates generally to an electrical control system for an electrochemical process and more particularly to a control system for selectively energizing a load with electrical energy, the electrical energy being controlled to provide a preselected amount of positive current and also a preselected amount of reversed current, the control of the reversed current being independent of the control of the positive current.

Many electrical and chemical processes utilizing electrical energy require the application of a positive voltage which may be periodically, selectively reversed in polarity. In many applications this periodicity is required to either be symmetrical or asymmetrical. For example, it has been found that in certain plating processes, a more uniform coating of plating metal is achieved by periodically reversing the process such that some of the plated metal is periodically depleted from the workpiece. Also, in certain electrical systems, as for example transformer systems, it has been found that a periodic reversal of rectified current through the transformer winding aids in minimizing the saturation of the core of the transformer. Further, in some etching processes it has been found that the polarity of a direct current may be reversed to achieve a greater degree of refinement in the finished product.

Certain systems have been devised in the prior art for periodically reversing the polarity of electrical energy being fed to the load, but those systems have been found to be unsatisfactory in certain respects. These prior systems include electromechanical means of alternately switching the output of a direct current source, as for example through the use of mechanical switches, circuit breakers and contactors. However, it is readily apparent that such electromechanical systems often require the making and breaking of large voltages and/or current with the consequent arcing and surging of the electrical energy with its attendant contact pitting and other known defects. Further, the systems are undesirably slow in operation due to the inertia of the mechanical portions of the system.

A system utilizing the techniques of the present invention minimizes the effect described above in connection with the prior art systems. The system of the present invention utilizes semiconductor switching elements or other devices, all of which have the capability of switching electrical energy as well as rectifying. With the present state of the semiconductor art, the system of the present invention is capable of controlling large currents with the speed and reliability attendant to the use of semiconductor devices.

Accordingly, it is one object of the present invention to provide an improved control system for periodically reversing the polarity of electrical energy through a load, with the resultant wave being symmetrical or asymmetrical.

It is another object of the present invention to provide am improved control system for electromechanical processes or other systems for supplying electrical energy wherein the energy being supplied to the load may be reversed in polarity, the control for the positive portion of the cycle being independent of and discrete from the control for the negative portion of the cycle.

Further objects, features and advantages of this invention will become apparent from a consideration of the following description, the appended claims and the accompanying drawings in which:

FIG. 1 is a schematic diagram illustrating the features of the present invention in a single phase half-wave rectification system;

FIG. 2 is a schematic diagram illustrating the features of the present invention as applied to a polyphase half-wave rectification system;

FIG. 3 is a schematic diagram illustrating certain principles of the present invention as applied to a multiphase full-wave rectification system; and FIG. 4 is a waveform diagram illustrating representative waveforms which may be achieved by incorporating the principles of the present invention.

Referring now to FIG. 1 there is illustrated a single cycle half-wave rectifying system 10 which includes a source of electrical energy 12 feeding alternating current electrical energy to a load 16 through a transformer 14 and a control system 20. The transformer includes a primary winding 22 magnetically coupled to a secondary winding 24 through a core member 26. The load 16 may take the form of an electrochemical bath, for example a nickel plating process or etching process.

The control system 20 includes a first rectifying element 30 in the form of a silicon-controlled rectifier and a second control element 32 in the form of another silicon-controlled rectifier, the two control elements 30, 32 being connected in inverse parallel, back-to-back relation between the transformer 14 and the load 16. The control rectifiers 30, 32 include anode and cathode electrodes for conducting the main current flow through the devices 30, 32, and also gate electrodes 36, 38 which are utilized in controlling the conduction of current through the devices 30, 32, as is common in the art. The gate electrode 36 is fed with control discrete pulses by means of a control circuit 40 and the gate electrode 38 is supplied with control pulses from a control discrete circuit 42.

Either of the control rectifiers 30, 32 may be considered to be supplying electrical energy in the forward direction and the opposite control rectifier will supply electrical energy in the opposite direction. Accordingly, the control circuits 40, 42 controlling the forward current supplying devices 30, 32 may be selectively energized for a predetermined period of time, which may or may not comprise a plurality of rectified alternating current pulses from the source 12 to the load 16. Further, the opposite devices 30, 32 may than be selectively energized for any number of successive pulses, the successive pulses being programmed to occur at any point in the stream of pulses in the forward direction. By appropriate programming, any desired combination of symmetrical and asymmetrical waveforms and polarities may be obtained.

Referring now to FIG. 2 there is illustrated a polyphase half-wave rectifying system 50 which includes a three-phase input from a three-phase transformer 52 comprising a plurality of primary windings 54, 56 and 58 coupled to a plurality of secondary windings 60, 62, 64 through a magnetic core 66. The output of the secondary windings 60, 62, 64 is fed to a load circuit 68 through a plurality of control networks 70, 72, 74, in the case of the upper portion of the secondary windings 60, 62, 64, and through a common buss 76 in the case of the lower end of the secondary windings 60, 62, 64.

As was the case with the circuit of FIG. 1, half of the alternating current from each phase is controlled by means of a rectifying device 80, 82, 84 and the other half is controlled by a second rectifying device 86, 88, 90 connected in inverse parallel back-to-back relation with each of the respective control devices 80, 82 and 84. Each of the control devices 80, 82, 84 are controlled through gate electrodes by means of a control system 94 and each of the second group of control devices 86, 88 and 90 are controlled through their respective gate circuits by means of a separable control network 96. As was the case with FIG. 1, each of the control rectifiers 80, 82, 84 may be controlled independently of the control rectifiers 86, 88 and 90 to provide asymmetrical waveform of electrical energy being supplied to the load.

FIG. 3 illustrates a third embodiment of the invention as applied to a polyphase full-wave rectifying system. The polyphase electrical energy is supplied through a polyphase transformer 100 including a plurality of transformers 102, 104, 106 coupled, magnetically, through a common core 108. The transformers 102, 104, 106 are adapted to feed electrical energy to a load 110 by means of a common buss 112 connected to a center tap of each of the transformers 102, 104, 106 and a second buss 114 through an array of control networks 116.

The control array comprises first and second pairs of back-to-back inverse parallel connected rectifier networks 120 to 130, the rectifier network 120, 122 controlling the current from phase one transformer 102, the control networks 124, 126 controlling the second phase transformer 104 and the control networks 128, 130 controlling the current flow from the third phase transformer 106.

Each of the upper control rectifiers of the control networks 120 to 130 are controlled by means of a control circuit 134 and each of the lower control rectifier elements of the control circuits 120 to 130 are controlled a separate control network 136. Thus, the forward direction of current through the load 110 may be selectively and independently controlled from the control from the control of the reverse current through the load 110 in a manner similar to that described in conjunction with FIGS. 1 and 2.

Referring now to FIG. 4 there are illustrated two examples of the type of asymmetrical current flow which may be achieved by use of the systems of FIGS. 1 to 3. The upper waveform 140 is illustrated as having a plurality of successively decreasing duration pulses in the positive direction and a plurality of pulses in the negative direction, the first pulse being smaller than the second pulse in duration but equal in magnitude, and the third pulse being of less duration than the second pulse but of greater duration than the first pulse and of greater magnitude than either of the first or second pulses. In addition to pulse widths and amplitudes differing in each polarity, pulse spacing is likewise variable all as illustrated in the upper waveform of FIG. 4. In other words pulse amplitude modulation, pulse duration modulation and pulse position modulation, or any combination of the foregoing may be effected independently in each polarity.

This situation exists in accordance with the particular control program being utilized in the control networks 134, 136. The lowermost diagram of FIG. 4 illustrates a plurality of successive pulses of equal duration and magnitude in the positive and a plurality of equal pulses in magnitude and duration in the negative direction, both the upper and lower waveforms illustrating an asymmetrical waveform.

While it will be apparent that the embodiments of the invention herein disclosed are wall calculated to fulfill the objects of the invention, it will be appreciated that the invention is susceptible to modification, variation and change without departing from the proper scope or fair meaning of the subjoined claims.

I claim:

1. In an electrochemical power supply system for selectively reversing the flow of current from a source of electrical energy through a noninductive electrolytic load having a control circuit connected between source and said load, the improvement comprising a control circuit including a first substantially unidirectional bistable controllable conductive element normally in the nonconductive mode connected in controlling relation with the source and load in a first polarity sense, first discrete independent controlling means connected to said first bistable conductive means for switching said conductive means between the nonconductive and the conductive modes in response to a control pulse, a second substantially unidirectional bistable controllable conductive element normally in the nonconductive mode connected in controlling relation with the source and load in a second polarity, a second discrete independent controlling means connected to said second bistable conductive means for switching said second conductive means between the nonconductive and the conductive modes in response to a control pulse, said first and second controlling means being adapted to provide variable independent control of said first and second conductive elements and positive and negative waveform of electrical energy supplied to the load.

2. The circuit of claim 1 wherein said first conductive element is rendered conductive for a first preselected portion of a time period and said second conductive element is rendered conductive for a second preselected portion of the time period.

3. The circuit of claim 1 wherein said source of electrical energy is an alternating current source, and said first conductive element is selectively enabled for a preselected number of cycles while said second conductive element is disabled, and said second conductive element is enabled for at least a portion of one cycle.

4. The circuit of claim 1 wherein said conductive elements are controlled semiconductor devices connected in parallel, back-to-back relation.

5. The circuit of claim 4 wherein said source of electrical energy includes a source of polyphase voltage and pairs of said conductive elements are connected in series circuit with said load to control each of the phases of said polyphase source.

6. The circuit of claim 4 wherein said semiconductor devices are controlled rectifiers having gate electrodes, the gate electrode of said first conductive element being connected to said first controlling means and the gate electrode of said second conductive element being connected to said second controlling means.

7. The circuit of claim 1 wherein said independent controls are programmed to provide asymmetric waveforms in each polarity.

8. The circuit of claim 7 wherein said independent controls are programmed to provide differing and variable pulse widths, pulse spacing and pulse amplitude in each polarity.

* * * * *